United States Patent [19]

Jones et al.

[11] Patent Number: 5,262,252
[45] Date of Patent: Nov. 16, 1993

[54] WELDED PRESSURE VESSEL FOR A METAL OXIDE-HYDROGEN BATTERY UTILIZING A FLEXIBLE WELD RING

[75] Inventors: Kenneth R. Jones, Oconomowoc; Paul J. Kaprelian, Raymond, both of Wis.

[73] Assignee: Globe-Union Inc., Milwaukee, Wis.

[21] Appl. No.: 773,251

[22] Filed: Oct. 9, 1991

[51] Int. Cl.$^5$ ............................................. H01M 2/10
[52] U.S. Cl. ..................................... 429/186; 429/101
[58] Field of Search ............................... 429/101, 186

[56] References Cited

U.S. PATENT DOCUMENTS

| | | |
|---|---|---|
| 1,810,825 | 6/1931 | Furrer . |
| 1,980,561 | 11/1934 | Wagner . |
| 4,324,845 | 4/1982 | Stocker .............................. 429/101 |
| 4,523,906 | 4/1985 | Chang et al. ...................... 228/184 |
| 4,546,054 | 10/1985 | Carr et al. .......................... 429/101 |
| 4,611,830 | 9/1986 | von Ahrens .......................... 285/22 |
| 4,950,564 | 8/1990 | Puglisi et al. ................... 429/186 X |
| 4,957,830 | 9/1990 | Jones ................................ 429/101 |

Primary Examiner—John S. Maples
Attorney, Agent, or Firm—Andrus, Sceales, Starke & Sawall

[57] ABSTRACT

A metal oxide-hydrogen battery having an outer metal pressure vessel that contains a plurality of cell modules. The vessel is composed of a cylindrical shell and the open ends of the shell are enclosed by dome-shaped heads. In producing the vessel, a weld ring is positioned between each end of the shell and the respective head and each weld ring includes a base which is engaged with the inner surfaces of the shell and head and a radial fin which extends outwardly from the base and is located between the opposed ends of the shell and head. A weld is made interconnecting the weld ring with the head and shell. The weld ring is free of internal spokes and the radial thickness of the weld ring is from one to six times the thickness of the vessel wall. With this construction, the weld ring will flex with the shell during cycling of the battery to prevent undue stress at the welded joint.

4 Claims, 1 Drawing Sheet

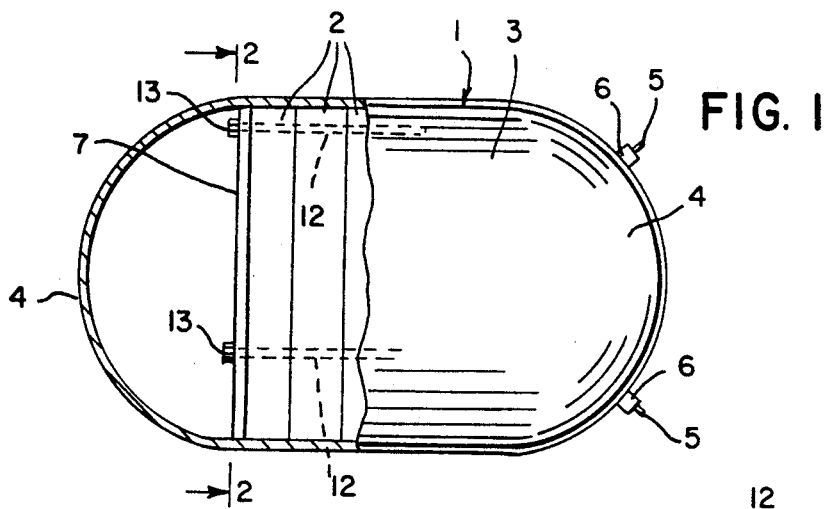
FIG. 1
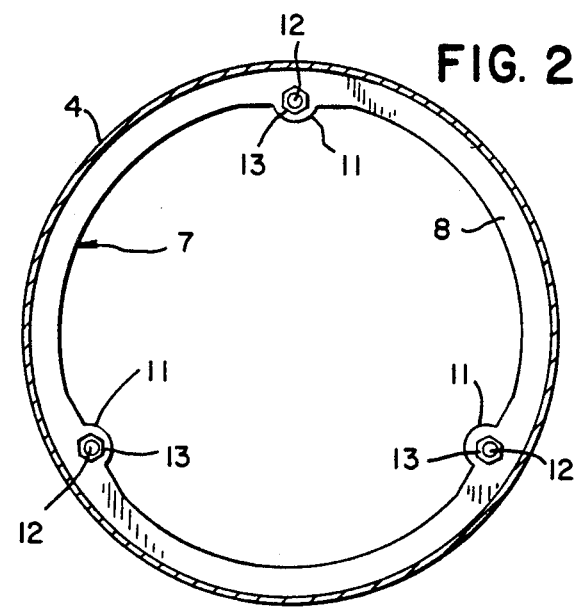
FIG. 2
FIG. 3
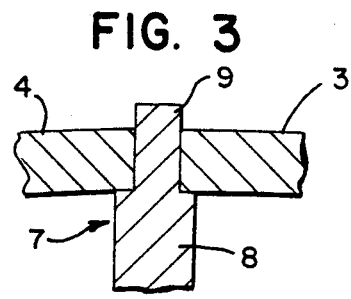
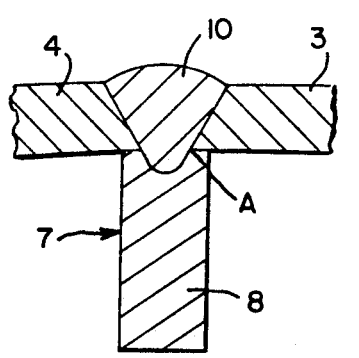
FIG. 4
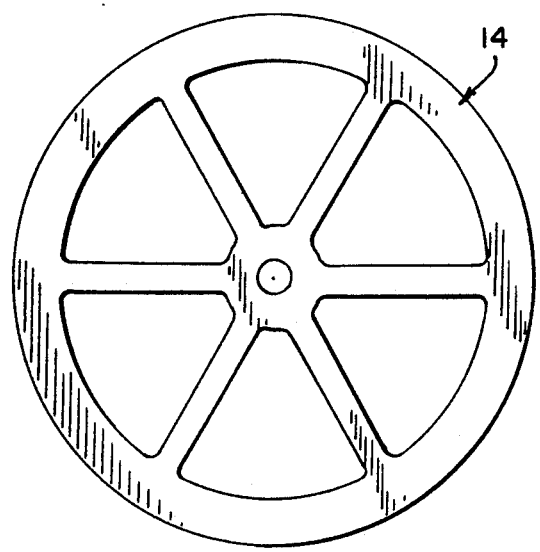
FIG. 5
PRIOR ART

WELDED PRESSURE VESSEL FOR A METAL OXIDE-HYDROGEN BATTERY UTILIZING A FLEXIBLE WELD RING

BACKGROUND OF THE INVENTION

Metal oxide-hydrogen batteries, such as nickel oxide-hydrogen batteries, have seen use as aircraft starter batteries and in aerospace applications, because they are rechargeable, have an extremely long cycle life and provide a uniform output during the entire discharge cycle.

In the typical metal oxide-hydrogen battery, the battery cells are sealed in an outer metal pressure vessel that contains pressurized hydrogen gas. On discharge of the battery, the hydrogen gas diffuses through the electrolyte surrounding the catalyst surfaces of the negative electrodes and becomes disassociated to the mono-atomic form. The mono-atomic hydrogen is ionized and combines with hydroxyl ions to form water, with an electron being released in the process of forming each hydrogen ion. In addition, hydroxyl ions are formed at the negative electrode by the reaction of water with the available oxygen content of the nickel oxide. As a result of these reactions, an electron current is produced in an exterior circuit.

On recharging, the reaction is reversed with the recharging being characterized by the regeneration of hydrogen at the negative electrode and the reoxidation of the nickel hydroxide at the positive electrode.

In fabricating a nickel-oxide hydrogen battery, the cell modules are placed within the shell of the pressure vessel and dome-shaped heads are then welded to each end of the shell. To facilitate welding, a metal weld ring formed of the same metal or alloy as the vessel, preferably Inconel, is located at the joint between each end of the shell and the respective head. The typical weld ring has a generally T-shaped cross section, including a base portion, which is located in contact with the inner surfaces of the shell and head, and a radial fin which extends outwardly between the opposed or abutting ends of the shell and head. Laser or electron beam welding is commonly used to connect the weld ring to the ends of the shell and head.

The weld ring provides several functions. The weld ring prevents blow-by of the molten metal during welding and prevents the molten metal from contacting the battery cells which could have an adverse effect on the performance of the battery. In addition, the weld ring serves to provide make-up metal to replace evaporated molten metal during welding, and provides strength for the heat effected zone of the weld. As a further function, the weld ring can provide a mounting frame for the cell modules to position the cell modules within the vessel and prevent shifting of the cell modules.

In order to provide these functions, the weld rings, as used in the past, have been heavy rigid structures having a relatively thick outer annular section, as well as spokes or braces which extend across the central portion of the ring.

In use, a metal oxide-hydrogen battery may be subject to thousands of charging and discharging cycles, in which the internal hydrogen pressure varies from a minimum pressure of perhaps 50 psi to a maximum pressure of about 900 psi. For satellite or aerospace applications, it is necessary to subject the metal oxide hydrogen battery to a rigorous test procedure, in which the battery is subjected to approximately 40,000 cycles at an elevated pressure about 2.5 times the maximum pressure to be encountered in service, or about 2,200 psi. Under this test procedure, it has been noted that cracking can occur at the junction between the shell and the weld. During the pressure cycling, the shell will expand radially to a greater extent than the dome-shaped head, thus subjecting a portion of the weld adjacent the shell to stress, which can cause cracking and failure. The welded joint in the metal oxide hydrogen battery cannot be heat treated due to the fact that the battery is contained within the vessel and the heat treatment would destroy the battery.

While it is possible to overcome the cracking problem at the welded joint by increasing the wall thickness of the pressure vessel, this solution is not satisfactory, for it will increase the weight of the battery which is of prime concern in a satellite or aerospace application.

SUMMARY OF THE INVENTION

The invention is directed to a metal oxide-hydrogen battery, such as a nickel oxide-hydrogen battery and incorporates a flexible weld ring, which will minimize stress at the weld joint between the shell and the head, when the battery is subjected to discharge and charge cycling.

The weld ring is formed of the same metal as the pressure vessel, preferably Inconel, and is provided with a base section which bears against the inner surfaces of the head and shell. A radial fin which extends circumferentially around the entire weld ring and is located between the opposed or abutting ends of the shell and head.

A weld, preferably a laser weld, interconnects the weld ring to the opposed ends of the shell and head.

To provide the weld ring with a measure of flexibility in a radial direction, the base section of the ring is formed with a radial thickness in the range of 1:1 to 6:1 with respect to the wall thickness of the vessel, and preferably a thickness ratio of 3:1. In addition, the ring is formed without spokes, struts, or internal braces.

With this construction, the ring will tend to expand radially with radial expansion of the shell during the charging cycle, to thereby minimize stress concentrations at the junction between the well and the end of the shell, as has occurred in the past. The invention takes a different approach than that of the past practice, for in the past, it was thought necessary to use a heavy rigid weld ring to prevent expansion and contraction at the weld joint.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation of a typical metal oxide-hydrogen battery with parts broken away in section and incorporating the invention;

FIG. 2 is a section taken along line 2—2 of FIG. 1;

FIG. 3 is an enlarged fragmentary longitudinal section showing the weld ring positioned between the opposed ends of the head and shell;

FIG. 4 is a view similar to FIG. 3 showing the weld between the head and shell; and FIG. 5 is a plan view of a prior art weld ring.

DESCRIPTION OF THE ILLUSTRATED EMBODIMENT

FIGS. 1-4 illustrate a rechargeable metal oxide-hydrogen battery, such as a nickel oxide-hydrogen battery. The battery is composed of an outer metal pressure vessel 1 that houses a group of cell modules 2. The cell modules are a conventional type and, in general, can be composed of a pair of back-to-back positive electrodes spaced apart by a separator layer along with a negative electrode, each disposed adjacent and separated from a positive electrode. Positive electrodes are generally in the form of flat porous sintered metal plaques impregnated with nickel hydroxide, while the negative electrodes are in the form of fine mesh nickel screens having a catalyst, such as platinum black, bonded to one surface of the screen through a hydrophobic polymeric material. An electrolyte, such as potassium hydroxide solution, is impregnated into the fibrous separator layers that separate the electrodes. The cell modules can be connected together either in series or parallel relation to obtain the desired voltage output.

Vessel 1 includes a cylindrical shell 3, the ends of which are enclosed by dome-shaped heads 4. Electrical leads 5 are connected to the electrodes of the cell modules and extend in sealed relation through fittings 6, which can be located in one of the heads 4 of the circuit.

The shell 3 and heads 4 of vessel 1 are formed of a high strength, corrosion resistant metal or alloy, such as Inconel or stainless steel, and have a wall thickness generally in the range of 0.030 to 0.060 inches.

The ends of shell 3 are welded to the respective heads 4 through use of a weld ring 7, formed of the same metal as the vessel 1. Weld ring 7 includes a base section 8, which as shown in FIG. 3, is in contact with the inner surface of shell 3 and head 4, and a radially extending fin 9 which extends outwardly from the central portion of base section 8 between the opposed ends of the shell 3 and head 4. Fin 9 has a radial dimension slightly greater than the wall thickness of shell 3 and head 4, as shown in FIG. 3. The members are welded together, preferably with laser or electron beam welding, to provide a weld 10, as shown in FIG. 4.

Weld ring 7 provides multiple functions. As the base section 8 extends to either side of the joint, it prevents blow-by of molten metal during the welding process, thus preventing molten metal from contacting the battery cell modules 2 and possibly damaging the cell modules. Further, the outer portion of fin 9 is consumed during the welding operation and serves as make-up metal to replace evaporated molten metal during the welding.

Weld ring 7 also serves as an anchor for the cell modules 2. In this regard, the inner portion of ring 7 is provided with a plurality of enlarged areas 11 having holes which receive tie rods 12 that extend through the cell modules. The outer ends of tie rods 12 are threaded and receive nuts 13. The tie rods connect the cell modules 2 to the weld rings 7, thus positioning the cell modules and preventing displacement of the cell modules within the vessel 1.

During cycling of the battery, the hydrogen pressure on discharging may decrease to a value of about 50 psi, while on charging a maximum pressure in the range of 900 psi, may be encountered. In service, the battery may be subjected to thousands of charging and discharging cycles. Because of the thin walled nature of shell 3, the shell will expand radially during the charging cycle and the mid-point of the length of the shell may expand up to 0.005 inch. The dome-shaped configuration of heads 4 will tend to resist expansion during the charging cycle, with the result that stress concentrations are encountered in the weld joint, particularly, at the area indicated by A in FIG. 4, where the weld joins the inner edge of the shell.

In the past, spoked weld rings, such as 14 shown in FIG. 5, were employed, on the theory that the weld ring should be heavy and rigid to withstand the stress concentrations occurring during cycling. However, the invention has discovered that the stress at the weld joint is more readily withstood, not by utilizing a heavier more rigid weld ring, as in the past, but by employing a light flexible ring. To provide the flexibility for weld ring 7, the ring should be spokeless, meaning that it should not have any spokes, braces, or other type of connectors which connect spaced portions of the ring. In addition, the radial thickness or depth of base 8 of weld ring 7 should be in the range of 1:1 to a maximum of 6:1, with respect to the wall thickness of vessel 1. Using a spokeless weld ring along with a thickness in the aforementioned range enables the weld ring to flex during cycling of the vessel to minimize the stress concentrations in the welded area.

The following table shows the stress at the weld joint in relation to the weld ring thickness:

| Weld Ring Thickness | Radial Shell Disp. | Radial Ring Disp. | Maximum Stress |
| --- | --- | --- | --- |
| 0.187 | 0.00486 | 0.00173 | 123,000 psi |
| 0.125 | 0.00486 | 0.00213 | 111,000 psi |
| 0.060 | 0.00486 | 0.00291 | 90,420 psi |

The above test data was obtained using a 5 inch diameter Inconel pressure vessel with a wall thickness of 0.030 inch. An Inconel spokeless weld ring was employed. The expansion of the shell was measured at a pressure of 750 psi and the radial shell displacement was taken at a location 1 inch from the weld joint.

From the above table it can be seen that by reducing the thickness of the base section of the spokeless weld ring, the radial expansion of the weld ring increased and unexpectedly the maximum stress at the weld joint was substantially reduced. More specifically, as the radial thickness of the weld ring was decreased form 0.187 inch to 0.060 inch, the maximum stress at the weld joint was reduced from 123,000 psi to 90,420 psi. Thus, the invention takes a different approach than prior art practices which utilized a heavy rigid weld ring that was virtually incapable of expansion at the weld joint.

Various modes of carrying out the invention are contemplated as being within the scope of the following claims particularly pointing out and distinctly claiming the subject matter which is regarded as the invention.

We claim:

1. An assembly for producing a metal oxide-hydrogen battery, comprising an outer metal pressure vessel including a generally cylindrical shell having a pair of open ends, a dome-shaped head to enclose each end of said shell, each end of said shell being disposed in opposed relation to an end of a head, a plurality of cell modules disposed in said vessel, a weld ring disposed between each end of the shell and the end of the corresponding head, each weld ring having a base portion including an inner annular surface and a pair of outer annular surfaces separated by an outwardly extending radial fin, the outer annular surfaces of each weld ring being disposed in contact with the inner surfaces of the shell and the corresponding head and each fin being disposed between the opposed end of the shell and the corresponding opposed end of the head, said weld ring having a central opening free of obstructions, the radial depth of said base portion being in the ratio of 1:1 to 6:1 with respect to the wall thickness of said vessel, the inner surface of said base portion being provided with a plurality of circumferentially spaced inwardly extending projections, each of said projections having a hold, and connecting means extending through said cell modules and received within the holes in the weld rings to thereby support said cell modules in said vessel.

2. The battery of claim 1, wherein the outer surface of said vessel is exposed.

3. The battery of claim 1, wherein the vessel has a wall thickness in the range of 0.030 to 0.060 inch.

4. The battery of claim 1, wherein the radial thickness of said base portion is greater than the longitudinal width of said base portion.

* * * * *